United States Patent [19]

Sato

[11] 4,206,487
[45] Jun. 3, 1980

[54] CASSETTE MAGNETIC RECORDING AND REPRODUCING APPARATUS AND MINI-CASSETTE ADAPTER

[75] Inventor: Masaaki Sato, Hachioji, Japan

[73] Assignee: Olympus Optical Company Limited, Tokyo, Japan

[21] Appl. No.: 949,558

[22] Filed: Oct. 10, 1978

[30] Foreign Application Priority Data

Oct. 13, 1977 [JP] Japan .................. 52-122819
Oct. 13, 1977 [JP] Japan .................. 52-122820

[51] Int. Cl.² ............................................. G11B 15/26
[52] U.S. Cl. ..................................................... 360/94
[58] Field of Search .......................................... 360/94

[56] References Cited
U.S. PATENT DOCUMENTS 3,632,894  1/1972  Bretschneider et al. .............. 360/94
3,964,099  6/1976  Sato ........................................ 360/94

Primary Examiner—Robert S. Tupper
Attorney, Agent, or Firm—Toren, McGeady and Stanger

[57] ABSTRACT

A cassette type magnetic recording and reproducing apparatus comprises a housing, a cassette receiving portion provided therein, at least one magnetic head and a pinch roller provided at the same position in the cassette receiving portion, a first pair of drive shafts for a large tape cassette provided in the charging portion, and a recess portion formed at the center of the cassette receiving portion for receiving an adapter for a small tape cassette. The pair of drive shafts for the large cassette is arranged in the recess portion for the adapter and a second pair of drive shafts for the small cassette is provided in the adapter and driven through a transmission hub engaged with the first pair of drive shafts.

3 Claims, 6 Drawing Figures

CASSETTE MAGNETIC RECORDING AND REPRODUCING APPARATUS AND MINI-CASSETTE ADAPTER

BACKGROUND OF THE INVENTION

The present invention relates to a cassette type magnetic recording and reproducing apparatus and to an adapter for enabling mounting and using two kinds of cassettes of large and small sizes in a same cassette receiving portion.

Besides the generally used compact cassettes, there is often used a very small microcassette (trade name) which is smaller than the compact cassette, or an L-cassette (trade name) which is larger than the compact cassette, the size of the cassette utilized varying in accordance with demand.

However, these large and small cassettes require respective recording and reproducing apparatus owing to their different structures, and it is impossible to use a single apparatus for two kinds of different cassettes without an adapter. Therefore, as disclosed in Japanese Utility Model Application Publication No. 22,573/72, in order to use a small type cassette in an apparatus for a large type cassette, a hub gap of the small type cassette and the inserting window portion of a head and pinch roller are made as large as in the large type cassette but small in external appearance.

With the above construction, two large and small cassettes are alternately usable in a single tape recorder, but since the small type cassette cannot be made too small as compared with the large type cassette the hub gap will be wide and the space between the outer wall will be narrow to provide for exchangeability, and as a result, a long tape cannot be wound and useless space is required.

Further, in Japanese Patent Laid-open No. 88,503/74 filed by the same applicant or Japanese Patent Laid-open No. 84,617/73, two kinds of large and small cassettes are used in one and the same magnetic recording and reproducing apparatus, so that an adapter for the small cassette is formed in compliance with the shape of the large type cassette. However, these adapters must have their own separate head, pinch roller and the like, and when such adapter is used, a cassette lid of the apparatus cannot be closed and the tape recorder becomes inconvenient for handling.

SUMMARY OF THE INVENTION

An object of the present invention is to eliminate the above described drawbacks.

Another object of the present invention is to provide a cassette type magnetic recording and reproducing apparatus enabling use of large and small cassettes in the same cassette receiving portion, which is simple in construction and improved utility.

A further object of the present invention is to provide an adapter for a cassette type magnetic recording and reproducing apparatus which includes a drive shaft for a small cassette and which is detachably mountable in the same cassette receiving portion so as to easily enable use of two kinds of large and small cassettes, if necessary, with a simple construction and easy handling.

According to the present invention there is provided a cassette type magnetic recording and reproducing apparatus comprising a housing, a cassette charging portion provided therein, at least one magnetic head and a pinch roller provided at the same position in the cassette charging portion, a first pair of drive shafts for a large tape cassette provided in the charging portion, and a recess portion formed at the center of the cassette charging portion for receiving an adapter for a small tape cassette.

The pair of drive shafts for the large cassette is arranged in the recess portion for the adapter and a second pair of drive shafts for the small cassette is provided in the adapter and driven through a transmission hub engaged with the first pair of the drive shafts.

An adapter for use in the cassette type magnetic recording and reproducing apparatus comprises a pair of transmission hubs, a pair of drive shafts driven by the hubs, an endless belt arranged between the pair of transmission hubs and the pair of drive shafts, and a press pin for pressing the small cassette to a magnetic head.

A pulley is integrally formed with the drive shaft for the small cassette.

DESCRIPTION OF THE PREFERRED EMBODIMENT

Figure 1:
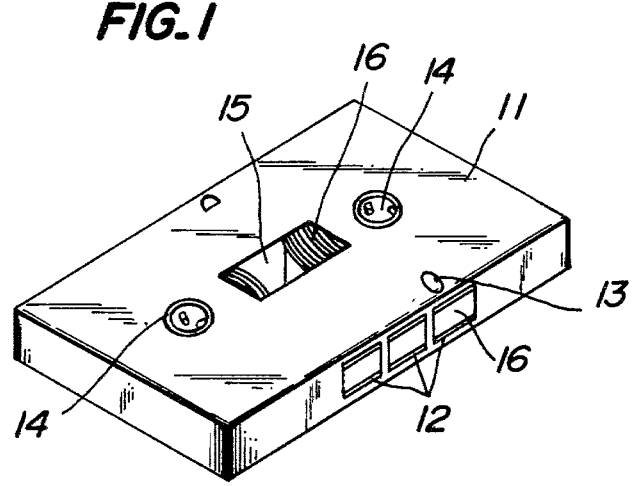
FIG. 1 is a perspective view showing a large cassette used for a cassette type magnetic recording and reproducing apparatus according to the present invention.
Figure 2:
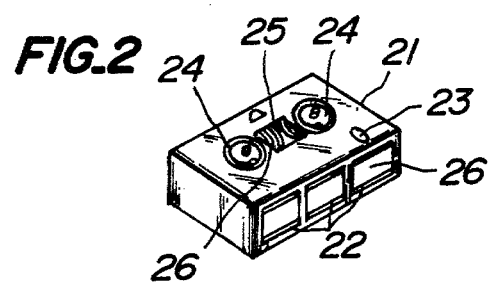
FIG. 2 is a perspective view showing a small cassette used for the apparatus according to the present invention.

Referring now to the drawings, wherein similar reference characters designate similar or corresponding parts throughout the several views, FIGS. 1 and 2 show a large type cassette 11 and a small type cassette 21 used in a cassette type magnetic recording and reproducing apparatus according to the present invention. A magnetic head (not shown), a pinch roller inserting window portion 22 and a capstan shaft hole 23 of the small cassette 21 are provided in an appropriate arrangement, size and the like.

The above large cassette 11 is further provided with a pair of tape hubs 14 and a tape observation window 15, and a magnetic tape 16 can be observed through this window 15.

On the other hand, the small cassette 21 is provided with a pair of tape hubs 24 narrower than those of the large type cassette 11 and an observation window 25 provided between these hubs, and a magnetic tape 26 can be observed through the observation window 25.

In addition, provided on lower surfaces of the large cassette 11 and the small cassette 21 are a pair of cassette guide pin receiving holes and cassette press in receiving holes, respectively.

Figure 3:
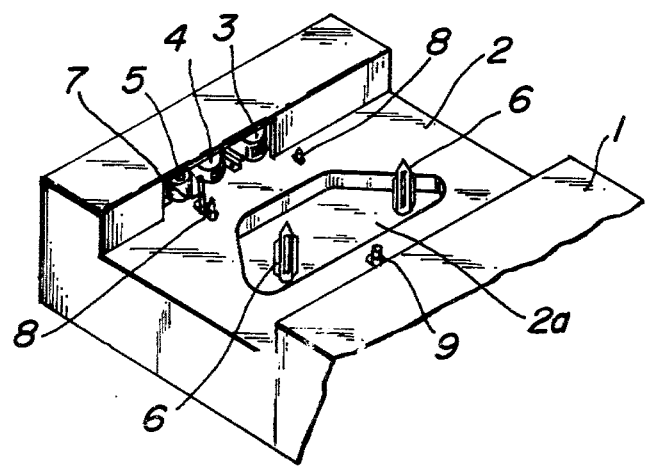
FIG. 3 is a partially perspective view showing a cassette receiving portion for the large cassette used in the apparatus according to the present invention.

A cassette receiving portion 2 of a magnetic recording and reproducing apparatus 1 for the large cassette 11 and the small cassette 21 having different tape hub gaps, respectively, has a size for charging the large cassette 11 as shown in FIG. 3, and on one side surface thereof, there are arranged magnetic heads 3, 4 and a pinch roller 5, which are slidable, if necessary.

On the other hand, at the center portion of the cassette receiving portion 2 there is formed a lower recess 2a, and a pair of large cassette drive shafts 6 rotatably project therefrom. When the pinch roller 5 is moved to an operational position, a capstan shaft 7 is rotatably arranged at the contact position and one cassette guide pin 8 is projected at the position adjacent to the capstan shaft 7. A guide pin corresponding to the guide pin 8 is arranged at a predetermined position, and a press pin 9 of the large cassette 11 which is projected at the top portion forms a triangle together with the pair of guide pins 8.

The press pin 9 is always biased toward the pair of guide pins 8 by means of an elastic member (not shown).

Figure 4:
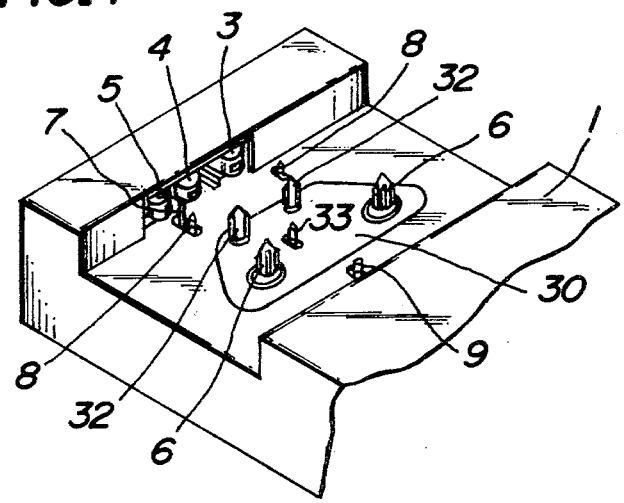
FIG. 4 is a partially perspective view showing the cassette receiving portion for the small cassette formed by using an adapter for the small cassette according to the present invention.
Figure 5:
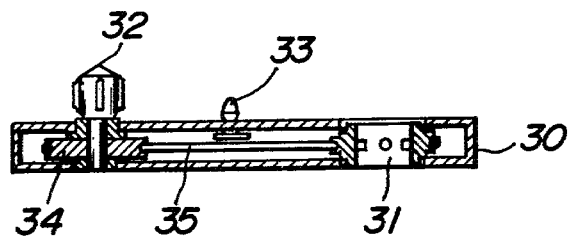
FIG. 5 is a cross-sectional view showing the adapter according to the present invention.
Figure 6:
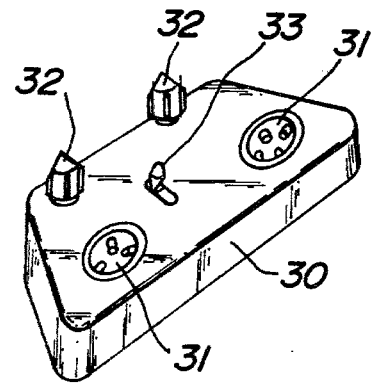
FIG. 6 is a perspective view showing the adapter according to the present invention.

The recess 2a of the magnetic recording and reproducing apparatus 1 is adapted to receive an adapter 30 for the small cassette as shown in FIG. 4 to enable utilization of the small cassette 21. The adapter 30 comprises a pair of transmission hubs 31, a pair of drive shafts 32 driven by the hubs 31 and a small cassette press pin 33 as shown in FIGS. 4 and 5.

The hub 31 is actuated by mounting on the large cassette drive shaft 6, and power is transmitted between the hub 31 and a pulley 34 integrally formed with the small cassette drive shaft 32 by means of an endless belt 35. A press pin 33 is always biased in the direction of the guide pin 8 by means of an elastic member (not shown).

When the adapter 30 is removed from the cassette receiving portion 2 of the magnetic recording and reproducing apparatus, the cassette 11 is located at a predetermined position by means of the drive shaft 6, the guide pin 8 and the press pin 9, and the magnetic heads 3, 4 and the pinch roller 5 enter into the opening window 13, and a desired recording and reproducing operation can be carried out.

When using the small cassette 21, with the adapter 30 mounted in the recess 2a of the cassette receiving portion 2, the transmission hub 31 of the adapter 30 is engaged by the large cassette drive shaft 6 and integrally rotated with the drive shaft 6.

After the adapter 30 is appropriately mounted, the small cassette 21 may be placed within the cassette receiving portion 2.

In this case, the small cassette 21 is previously formed to avoid contact with the large cassette apparatus 1, so that the drive shaft 6 can accept the small cassette 21 in operative engagement, and so that the cassette 21 may be maintained in operative position on the side of the head by means of the press pin 33 and the pair of guide pins 8.

After the small cassette 21 is mounted in the above manner, if an operation member is actuated, the pinch roller 5 and the magnetic heads 3, 4 enter into the cassette 21 and are brought into contact with the tape 26 to transmit rotation of the large cassette drive shaft 6 to the small drive shaft 32 through the transmission hub 31, the belt 35 and the pulley 34, and as a result, the drive shaft 32 is rotated at a desired speed for moving the tape 26.

Thus, with the use of the adapter 30, not only is recording and reproduction possible with the small cassette but quick feeding and rewinding can also be carried out, if necessary.

Thus, utilization of differently sized cassettes in the same cassette receiving portion is possible, the drive shaft portion for moving the tape for the small cassette being separately formed in the adapter with the head, the pinch roller and the guide pin being constructed for use with both the large and small cassette, whereby utilization of both the large and small cassettes is possible merely by detaching the adapter with a simple operation enabling easy use.

Accordingly, recording and reproducing are possible with the use of the large cassette at home, while the portable recording device for the small cassette is used when travelling, so that it is convenient to record with the small cassette away from home and to reproduce the recording with the apparatus according to the present invention at home.

When large and small cassettes are used for a video tape recorder, the large cassette may used indoors as a home video tape, while the small cassette may be used for recording outdoors, for example with a portable 8 mm camera. The recorded tape may be reproduced by a home video recorder, so that the tape can be conveniently reproduced with an apparatus having a large screen.

In addition, the invention is not limited to the described embodiment but it may be used by reversing sides or by properly arranging positions of the head, pinch roller, capstan shaft and the like in accordance with requirement.

As described above, the invention makes it possible to use two cassettes properly merely with the aid of an adapter for one magnetic recording and reproducing apparatus, so that a large cassette may be adapted for home use and a small cassette for portable use.

What is claimed is:

1. In a magnetic cassette tape player and recorder, the combination comprising:
   a housing;
   means defining a cassette receiving portion in said housing adapted to receive therein in operative engagement with said tape player and recorder a cassette of a first standardized size;
   an adapter member operative to adapt said tape player and recorder to receive in operative engagement a cassette of a second standardized size smaller than said first standardized size;
   a recess defined by said housing in said cassette receiving portion shaped to receive therein said adapter member;
   at least one magnetic head and a pinch roller provided at a position relative to said cassette receiving portion for operative engagement, individually, with tapes from cassettes of either said first or second size;
   a first pair of drive shafts located within said recess for receiving in driving engagement therewith said cassettes of said first size;
   a second pair of drive shafts in said adapter member located to receive in driving engagement therewith cassettes of said second size;
   transmission hub means in said adapter member arranged to be placed in driven engagement with said first pair of drive shafts when said adapter member is located within said recess; and
   connecting means within said adapter member for placing said second pair of drive shafts in driven engagement with said transmission hub means to effect driving of said second pair of drive shafts by said first pair of drive shafts;

said tape player and recorder and said adapter member being structured to enable said magnetic head and said pinch roller to be used for operative engagement with tapes of cassettes of both of said first size and said second size by dismounting and mounting, respectively, said adapter member.

2. A player and recorder according to claim 1, wherein said transmission hub means comprise a pair of transmission hubs, and wherein said connecting means comprise an endless belt engaged between said pair of transmission hubs and said second pair of drive shafts, said adapter member further comprising a press pin for pressing a cassette of said second size toward said magnetic head.

3. A player and recorder according to claim 2, wherein said second pair of drive shafts each have a pulley integrally formed therewith for engagement with said endless belt.

* * * * *